(12) United States Patent
Zang et al.

(10) Patent No.: US 11,812,110 B2
(45) Date of Patent: Nov. 7, 2023

(54) BULLET COMMENT PROCESSING METHOD AND APPARATUS

(71) Applicant: SHANGHAI BILIBILI TECHNOLOGY CO., LTD., Shanghai (CN)

(72) Inventors: Zhicong Zang, Shanghai (CN); Yiyi Zhou, Shanghai (CN); Yicong Mei, Shanghai (CN); Jun Fan, Shanghai (CN); Chaojie Chen, Shanghai (CN); Chaoran Li, Shanghai (CN); Sunrui Liu, Shanghai (CN); Jinhao Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/709,295

(22) Filed: Mar. 30, 2022

(65) Prior Publication Data
US 2022/0321969 A1 Oct. 6, 2022

(30) Foreign Application Priority Data

Apr. 2, 2021 (CN) .......................... 202110360908.3

(51) Int. Cl.
*H04N 21/4788* (2011.01)
*H04N 21/845* (2011.01)
*H04N 21/858* (2011.01)

(52) U.S. Cl.
CPC ..... *H04N 21/4788* (2013.01); *H04N 21/8455* (2013.01); *H04N 21/858* (2013.01)

(58) Field of Classification Search
None
See application file for complete search history.

(56) References Cited

U.S. PATENT DOCUMENTS

| 2010/0070878 A1* | 3/2010 | Amento | H04N 21/8146 |
| | | | 715/751 |
| 2017/0019715 A1* | 1/2017 | Hundemer | H04N 21/234 |

(Continued)

FOREIGN PATENT DOCUMENTS

| CN | 105898375 A | 8/2016 |
| CN | 105916057 A | 8/2016 |

(Continued)

*Primary Examiner* — Jason K Lin
(74) *Attorney, Agent, or Firm* — BakerHostetler

(57) ABSTRACT

The present application provides techniques for processing bullet screens. The techniques comprises determining a target bullet screen based at least in part on a number of likes received by each bullet screen associated with a target multimedia resource; obtaining attribute information of the target bullet screen comprising a resource time point indicating a time point of displaying the target bullet screen in the target multimedia resource; determining a target time point in the target multimedia resource from which the target multimedia resource starts to play based at least in part on the resource time point; generating prompt information based on the target bullet screen, the attribute information of the target bullet screen, attribute information of the target multimedia resource, and the target time point; and sending the prompt information to a target client computing device.

17 Claims, 8 Drawing Sheets

(56) References Cited

U.S. PATENT DOCUMENTS

2018/0007442 A1* 1/2018 Peng ................ H04N 21/26225
2018/0197109 A1   7/2018 Taylor et al.

FOREIGN PATENT DOCUMENTS

| | | | | |
|---|---|---|---|---|
| CN | 106028161 A | | 10/2016 | |
| CN | 106470356 A | | 3/2017 | |
| CN | 106792087 A | | 5/2017 | |
| CN | 107566906 A | | 1/2018 | |
| CN | 108200463 A | * | 6/2018 | ............ H04L 51/10 |
| CN | 109729414 A | | 5/2019 | |
| CN | 109948084 A | | 6/2019 | |
| CN | 110248251 A | | 9/2019 | |
| CN | 111479169 A | | 7/2020 | |
| CN | 112165646 A | | 1/2021 | |
| CN | 112188220 A | | 1/2021 | |
| CN | 112533051 A | | 3/2021 | |

* cited by examiner

BULLET COMMENT PROCESSING METHOD AND APPARATUS

CROSS-REFERENCE TO RELATED APPLICATION

The present application claims priority to Chinese Patent Application No. 202110360908.3, filed on Apr. 2, 2021, which is incorporated herein by reference in its entirety.

BACKGROUND ART

With the development of Internet technologies, when playing multimedia resources to viewers, more and more platforms provide the viewers with the function of sending bullet comments to increase the participation of the viewers. For example, when watching a video or listening to audio in a player, a viewer may send a bullet comment on the video or audio, and it is also common for other viewers to like the bullet comment.

SUMMARY OF THE INVENTION

In view of this, embodiments of the present application provide a bullet comment processing method. The present application also relates to a bullet comment processing apparatus, a computing device, and a computer-readable storage medium, to resolve the problem that the value of most-liked bullet comments cannot be further exploited, and users are not sufficiently motivated to send high-quality bullet comments in the prior art.

According to a first aspect of the embodiments of the present application, a bullet comment processing method is provided, applied to a server, and including:

determining a target bullet comment based on a like count of each bullet comment in a target multimedia resource;

obtaining target bullet comment attribute information of the target bullet comment and target resource attribute information of the target multimedia resource, the target bullet comment attribute information including a resource time point;

determining a target playing time point of the target multimedia resource according to the resource time point;

generating prompt information according to the target bullet comment, the target bullet comment attribute information, the target resource attribute information, and the target playing time point; and sending the prompt information to a target client.

According to a second aspect of the embodiments of the present application, a bullet comment processing method is provided, applied to a client, and including:

displaying prompt information sent by a server, the prompt information carrying a target resource link and a target bullet comment;

receiving a click instruction for the target resource link; and playing a target multimedia resource corresponding to the target resource link in response to the click instruction, and performing rendering in the target multimedia resource to generate the target bullet comment.

According to a third aspect of the embodiments of the present application, a bullet comment processing apparatus is provided, applied to a server, and including:

a bullet comment determining module, configured to determine a target bullet comment based on a like count of each bullet comment in a target multimedia resource;

an obtaining module, configured to obtain target bullet comment attribute information of the target bullet comment and target resource attribute information of the target multimedia resource, the target bullet comment attribute information including a resource time point;

a time point determining module, configured to determine a target playing time point of the target multimedia resource according to the resource time point;

a generation module, configured to generate prompt information according to the target bullet comment, the target bullet comment attribute information, the target resource attribute information, and the target playing time point; and a sending module, configured to send the prompt information to a target client.

According to a fourth aspect of the embodiments of the present application, a bullet comment processing apparatus is provided, applied to a client, and including: a display module, configured to display prompt information sent by a server, the prompt information carrying a target resource link and a target bullet comment;

a receiving module, configured to receive a click instruction for the target resource link; and a rendering module, configured to: play a target multimedia resource corresponding to the target resource link in response to the click instruction, and perform rendering in the target multimedia resource to generate the target bullet comment.

According to a fifth aspect of the embodiments of the present application, a computer device is provided, including a memory, a processor, and a computer instruction stored in the memory and executable on the processor, where the processor executes the computer instruction to implement the steps of the bullet comment processing method.

According to a sixth aspect of the embodiments of the present application, a computer-readable storage medium is provided, storing a computer instruction, where a processor executes the computer instruction to implement the steps of the bullet comment processing method.

The present application provides a bullet comment processing method, applied to a server, and including: determining a target bullet comment based on a like count of each bullet comment in a target multimedia resource; obtaining target bullet comment attribute information of the target bullet comment and target resource attribute information of the target multimedia resource, the target bullet comment attribute information including a resource time point; determining a target playing time point of the target multimedia resource according to the resource time point; generating prompt information according to the target bullet comment, the target bullet comment attribute information, the target resource attribute information, and the target playing time point; and sending the prompt information to a target client. The bullet comment processing method provided in an embodiment of the present application can effectively exploit the potential of bullet comments, implement bullet comment sharing, guide users to watch most-liked and astonishing parts of multimedia resources, motivate users further to send high-quality bullet comments, and improve user experience.

DETAILED DESCRIPTION OF THE EMBODIMENTS

Figure 1:
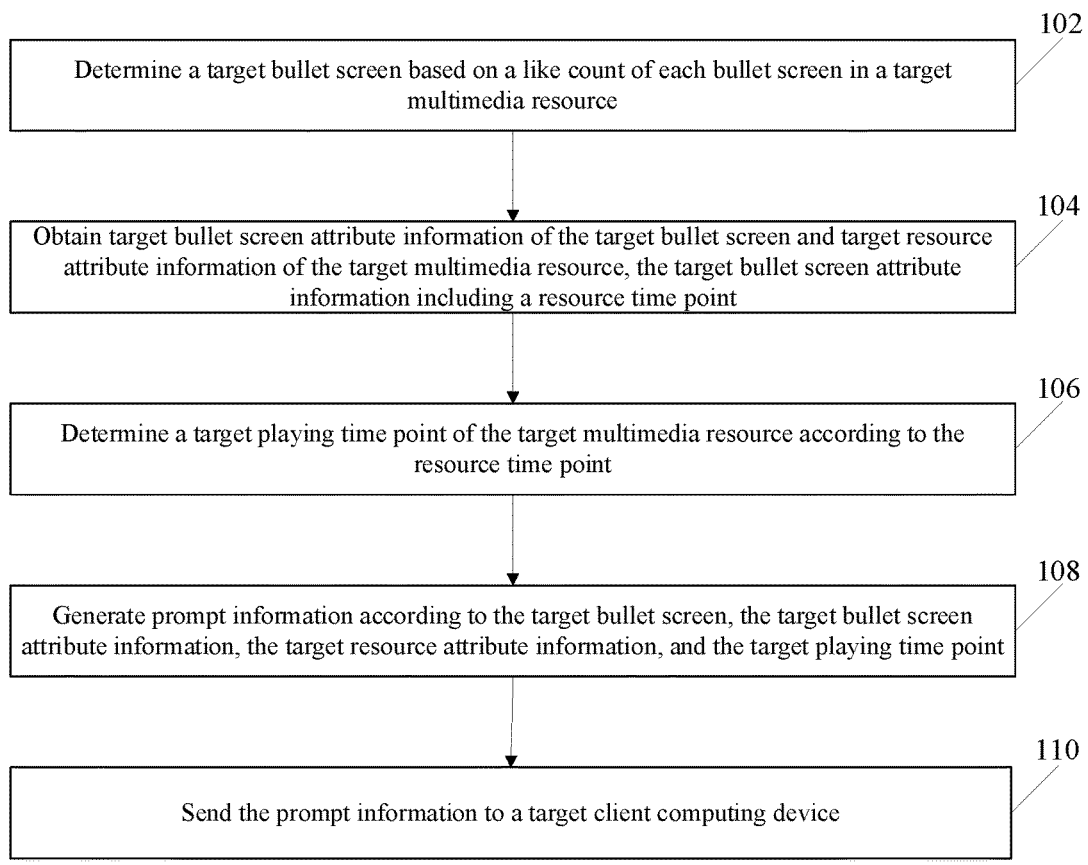
FIG. 1 is a flowchart of a bullet comment processing method applied to a server according to an embodiment of the present application.

In the following descriptions, many specific details are described to make the present application fully comprehensible. However, the present application can be implemented in other manners different from those described herein. Those skilled in the art may make similar extensions without contradicting the content of the present application. Therefore, the protection scope of the present application is not limited to specific embodiments disclosed below.

The terms used in one or more embodiments of the present application are intended solely for the purpose of describing specific embodiments and are not intended to limit one or more embodiments of the present application. The singular forms of "a", "an", and "the" as used in one or more embodiments of the present application and in the appended claims are also intended to include most forms unless the context clearly indicates otherwise. It should also be understood that the term "and/or" as used in one or more embodiments of the present application refers to and includes any or all possible combinations of one or more of the associated listed items.

It should be understood that while the terms "first", "second", and the like may be used in one or more embodiments of the present application to describe various kinds of information, such information should not be limited to these terms. These terms are used only to distinguish between the same type of information from one another. For example, without departing from the scope of one or more embodiments of the present application, "first" may also be referred to as "second", and similarly, "second" may also be referred to as "first". Depending on the context, for example, the word "if" as used herein may be interpreted as "at . . . " or "when . . . " or "in response to a determination".

First, nouns and terms involved in one or more embodiments of the present application are explained. A most-liked bullet comment is a comment with a like count exceeding a particular threshold.

A commentary service is provided that allows users to comment and/or share comments associated with a video or other content. The commentary service has transformed the viewing experience by displaying comments reflecting thoughts and feelings of users viewing the same video. This commentary service fosters a highly interactive and enjoyable viewing experience and allows a user to benefit from the strong emotional bonds with other users who share similar aspiration and interests. The comments on any content may be animated when displayed. For example, the comments may be shown scrolling (e.g., from right to left, left to right, top to bottom, bottom to top) across the content, which may be referred to as "bullet screens" or may be referred to as "bullet comments."

A bullet screen refers to a comment moving/scrolling across the screen in an effect of looking like a barrage in a flying shooting game, hence named as bullet screen. During watching a live broadcast or a video, a user can increase interaction between users or between users and network anchors by a way of sharing bullet screens. Bullet screens are displayed on a screen in a scrolling/moving manner so that they can be viewed by other users, which forms a new network social form based on video viewing and surrounding video content. At present, bullet comments (i.e., bullet screens) can only be liked, and there is no further operation for bullet screens with a lot of likes. Therefore, similar to ordinary bullet screens, most-liked bullet screens can only be displayed with the playback of multimedia resources, the value of such most-liked bullet screens cannot be further exploited, and users are not sufficiently motivated to send high-quality comments corresponding to high-quality bullet screens.

In the present application, a bullet screen processing method is provided. The present application also relates to a bullet screen processing apparatus, a computing device, and a computer-readable storage medium, which are described below in detail one by one in the following embodiments.

FIG. 1 is a flowchart of a bullet screen processing method applied to a server according to an embodiment of the present application. The method specifically includes the following steps.

Step 102: Determine a target bullet screen based on a like count of each bullet screen in a target multimedia resource.

Specifically, the multimedia resource is a video, audio, a picture or the like displayed to a user. The target multimedia resource is specifically a multimedia resource currently being processed. A viewer may send a bullet screen in a process of browsing and watching the target multimedia resource, and other users may perform a like operation on the bullet screen. The target bullet screen is a most-liked bullet screen, that is, a comment with a like count exceeding a threshold.

Specifically, the determining a target bullet screen based on a like count of each bullet screen in a target multimedia resource includes:

counting the like count of each bullet screen in the target multimedia resource; and determining a bullet screen with a like count exceeding a preset threshold as the target bullet screen.

During actual application, when a user likes a bullet screen in the target multimedia resource, like status of the bullet screen is recorded on a server. A like count of each bullet screen in the target multimedia resource is counted. If a like count of a bullet screen exceeds a preset threshold, it is determined that the bullet screen is a most-liked bullet screen. The most-liked bullet screen is the target bullet screen.

In a specific implementation provided in the present application, for example, the target multimedia resource is a video V. There are a total of 100 bullet screens in the video V. A like count of each bullet screen in the video V is counted. The preset threshold is 200. In a case that a like count of a bullet screen 1 "This is a test bullet screen"

exceeds 200, it is determined that the bullet screen 1 is a most-liked bullet screen. That is, the bullet screen 1 is the target bullet screen.

Optionally, the determining a bullet screen with a like count exceeding a preset threshold as the target bullet screen includes:

determining the bullet screen with the like count exceeding the preset threshold as an initial target bullet screen; and in a case that the initial target bullet screen meets a target bullet screen filter condition, determining that the initial target bullet screen is the target bullet screen.

During actual application, users send all kinds of bullet screens when watching multimedia resources. Some bullet screens are of high quality. For example, a bullet screen is closely relevant to a multimedia resource, or a bullet screen includes a high-quality humorous reference. Though with many likes, some bullet screens like "666" and "LOL" are of little significance. Therefore, in the method provided in the present application, bullet screens with a like count exceeding a threshold may be further filtered. A bullet screen with a like count exceeding a preset threshold is first set as an initial target bullet screen, and then an initial target bullet screen that meets a target bullet screen filter condition is set as a target bullet screen. The target bullet screen filter condition may be a preset condition or may be manual examination. During actual application, each bullet screen is scored on the server according to the content of the bullet screen and a degree of relevance between the bullet screen and a video. Therefore, an initial target bullet screen with a bullet screen score exceeding a threshold may be set as a target bullet screen. Alternatively, text analysis may be performed on an initial target bullet screen by using an artificial intelligence model, then a value of relevance between the initial target bullet screen and the target multimedia resource is determined, and an initial target bullet screen with the value of relevance exceeding a threshold is used as a target bullet screen.

In a specific implementation provided in the present application, still, for example, the target multimedia resource is the video V. A bullet screen like count threshold is 200. The like count of the bullet screen 1 "This is a test bullet screen" exceeds 200. In this case, the bullet screen 1 is an initial target bullet screen. In addition, a bullet screen score threshold is 90. A bullet screen score of the bullet screen 1 is 95. In this case, the bullet screen 1 is the target bullet screen.

Step 104: Obtain target bullet screen attribute information of the target bullet screen and target resource attribute information of the target multimedia resource, the target bullet screen attribute information including a resource time point.

The target bullet screen attribute information of the target bullet screen may be obtained after the target bullet screen is determined. The target bullet screen attribute information includes, but not limited to, a sending time point, a resource time point corresponding to the target multimedia resource, a bullet screen sender identifier, an accumulated like count, and a bullet screen score. The bullet screen sender identifier may include a bullet screen sender avatar and a bullet screen sender nickname. The resource time point is specifically a display time point of the target bullet screen in the target multimedia resource. For example, the multimedia resource is a video. The target bullet screen is displayed when the video is played to 00:30. In this case, the resource time point is 00:30.

In addition, the server may further obtain target resource attribute information of the target multimedia resource. The target resource attribute information includes, but not limited to, a resource publisher identifier, a resource publishing time, a resource title, an accumulated resource view count, and a resource liker count. The resource publisher identifier may include a resource publisher avatar and a resource publisher nickname.

In a specific implementation provided in the present application, the foregoing example is still used. Bullet screen attribute information of the bullet screen 1 and resource attribute information of the video V are obtained. The bullet screen attribute information of the bullet screen 1 carries a resource time point of the bullet screen 1 in the video V. The resource time point is 01:30.

Step 106: Determine a target playing time point of the target multimedia resource according to the resource time point.

Generally, the target multimedia resource starts to play from the beginning. That is, the target multimedia resource starts to play from the 00:00. The present application focuses on processing operations on a target bullet screen. Therefore, it is not necessary to pay attention to all the content of the target multimedia resource. It is only necessary to play the target multimedia resource from a middle position. The target playing time point is a specific playing time point of the target multimedia resource. For example, in a case that the target multimedia resource is a video and starts to play from 05:00, the target playing time point is 05:00.

During actual application, many users may post comments on one same target multimedia resource. There may be a number of bullet screens at a time point. That is, the resource time point of the target bullet screen may correspond to a plurality of bullet screens. If the target multimedia resource directly starts to play from the resource time point, the display of the target bullet screen may be incomplete. Therefore, to ensure that the target bullet screen is complete, a time point that is a period of time earlier than the resource time point needs to be picked to determine the target playing time point of the target multimedia resource. For example, the resource time point is 00:50. That is, the target bullet screen is displayed when the target multimedia resource plays to 00:50. To ensure the display effect of the target bullet screen, the target multimedia resource may start to play from 00:45. In this case, the target playing time point is 00:45.

Specifically, the determining a target playing time point of the target multimedia resource according to the resource time point includes:

obtaining a preset time span; and subtracting the preset time span from the resource time point to obtain the target playing time point of the target multimedia resource.

The preset time span is specifically a time span between a preset resource time point and a target playing time point. The preset time span may make the target multimedia resource start play from an appropriate time point and display the target bullet screen. That is, a viewer does not need to wait a long time to see the target bullet screen and is prevented from seeing an incomplete target bullet screen. After the preset time span is determined, the target playing time point of the target multimedia resource may be obtained by subtracting the preset time span from the resource time point.

In a specific implementation provided in the present application, the foregoing example is still used. The preset time span is set to three seconds. The resource time point is 01:30. In this case, it may be determined that the target playing time point of the target multimedia resource is 01:27.

Step 108: Generate prompt information according to the target bullet screen, the target bullet screen attribute information, the target resource attribute information, and the target playing time point.

Figure 2:
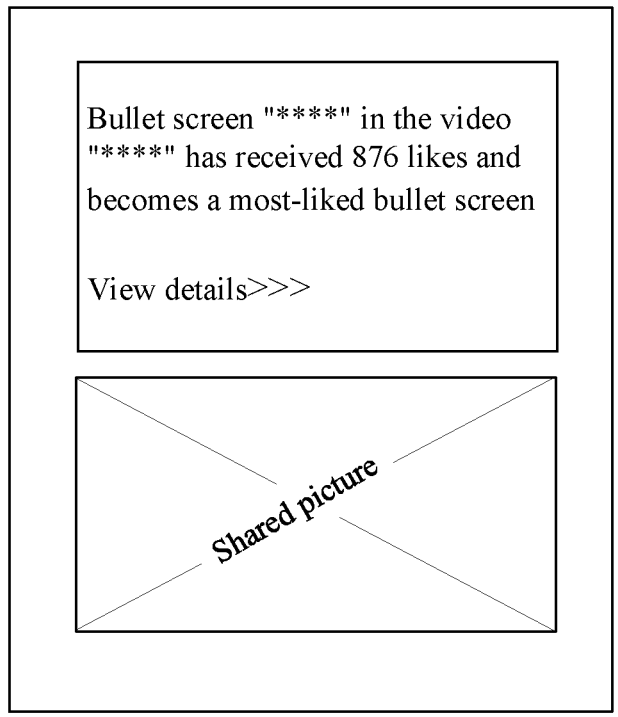
FIG. 2 is a schematic diagram of prompt information according to an embodiment of the present application.

The prompt information is specifically information used for informing a user that a bullet screen is a target bullet screen. FIG. 2 is a schematic diagram of prompt information according to a specific embodiment of the present application. As shown in FIG. 2, the prompt information is used for informing a user that a bullet screen is chosen as a most-liked bullet screen.

A specific representation form of the prompt information may be a text, a picture, a two-dimensional code, a barcode, or the like. The specific representation form of the prompt information is chosen as required in actual application. This is not limited in the present application.

Specifically, the generating prompt information according to the target bullet screen, the target bullet screen attribute information, the target resource attribute information, and the target playing time point includes the following steps S1082 to S1088.

S1082: Generate a prompt title according to the target bullet screen, the target bullet screen attribute information, and the target resource attribute information.

The prompt title is specifically specific content of the prompt information. The prompt title may be generated according to the target bullet screen, the target bullet screen attribute information, and the target resource attribute information.

Specifically, the generating a prompt title according to the target bullet screen, the target bullet screen attribute information, and the target resource attribute information includes:

obtaining a target resource title in the target resource attribute information;

obtaining a like count in the target bullet screen attribute information; and generating the prompt title according to the target resource title, the target bullet screen, and the like count.

The prompt title may be generated according to the target bullet screen, the like count in the target bullet screen attribute information, and the target resource title in the target resource attribute information. Referring to FIG. 2, "The bullet screen '**' in the video '' has received 876 likes and becomes a most-liked bullet screen" in FIG. 2 is a prompt title. "The video ''" is the resource title. "The bullet screen '**'" is the target bullet screen. 'has received 876 likes' is the accumulated like count.

During actual application, a user may send a plurality of bullet screens of the same content in one same multimedia resource or may add a resource time point corresponding to a target bullet screen in a prompt title to indicate which bullet screen is a target bullet screen.

Specific content in the prompt title may be adjusted according to an actual application case. Only a schematic example is provided in the present application. The specific content in the prompt title is not limited.

In a specific implementation provided in the present application, the foregoing example is still used. It is obtained that a resource title of the video V is "Video V", it is obtained that the target bullet screen is "This is a test bullet screen", and it is obtained that a like count of the target bullet screen is 546. In this case, the prompt title "'This is a test bullet screen' in the video V has received 546 likes and becomes a most-liked bullet screen!" may be generated.

S1084: Generate a target resource link according to the target resource attribute information and the target playing time point.

The target resource link is specifically a web link through which the target multimedia resource can directly play from the target playing time point. A user may start to play the target multimedia resource from the target playing time point according to the target resource link. For example, the target playing time point is 04:15. The user may start to play the target multimedia resource from 04:15 according to the target resource link.

Specifically, the generating a target resource link according to the target resource attribute information and the target playing time point includes:

obtaining an initial resource link in the target resource attribute information; and adding the target playing time point to the initial resource link to generate the target resource link.

The target resource attribute information includes an initial resource link corresponding to the target multimedia resource. The initial resource link is specifically a web link corresponding to the target multimedia resource. A user may start to load and play the target multimedia resource from the beginning according to the initial resource link. After the initial resource link is obtained, the target playing time point is added to an initial resource link as a playing parameter to generate a target resource link. For example, the initial resource link is "*:*\*", and the target playing time point is "03:03". The target resource link "*:*\*\03:03" may be generated.

After the target resource link is generated, the target resource link may be generated in a hyperlink form to prompt a user to click the target resource link. For example, a text "Click to view", "View details", or the like is set, and then a hyperlink is established between the text and the target resource link. As shown in FIG. 2, a hyperlink is established between "View details>>>" in FIG. 2 and the target resource link to allow the user to click "View details" to jump to the target resource link.

S1086: Generate a shared picture according to the target bullet screen, the target bullet screen attribute information, the target resource attribute information, the resource time point, and the target resource link.

The shared picture is specifically a picture for sharing generated according to the target bullet screen. That is, the target bullet screen may be shared through picture sharing. A user may intuitively see information such as the target bullet screen, the target resource title, the like count, and the target resource link from the shared picture. Based on this, the shared picture may be generated according to the target bullet screen, the target bullet screen attribute information, the target resource attribute information, the resource time point, and the target resource link.

Specifically, the generating a shared picture according to the target bullet screen, the target bullet screen attribute information, the target resource attribute information, the resource time point, and the target resource link includes:

obtaining a bullet screen sender identifier in the target bullet screen attribute information;

determining a target resource frame and a preset quantity of scene bullet screens in the target multimedia resource according to the resource time point;

adding the target bullet screen, the bullet screen sender identifier, and the scene bullet screens to the target resource frame to generate a to-be-shared picture;

generating a to-be-shared identifier according to the target resource link; and generating the shared picture according to the to-be-shared picture, the to-be-shared identifier, the target bullet screen attribute information, and the target resource attribute information.

The bullet screen sender identifier is specifically an identifier of a user sending the target bullet screen. Specifically, the obtaining a bullet screen sender identifier in the target bullet screen attribute information includes: obtaining a bullet screen sender nickname and a bullet screen sender avatar in the target bullet screen attribute information.

The bullet screen sender identifier includes a bullet screen sender avatar and a bullet screen sender nickname. If the bullet screen sender avatar is an animated avatar, the first frame of the animated avatar is chosen. If the bullet screen sender avatar is empty, a default placeholder image is used as the bullet screen sender avatar.

It is determined that a resource frame of a target multimedia resource corresponding to the resource time point is a target resource frame. In a case that the target multimedia resource is audio, it may be determined that a cover picture of the audio is a target resource frame. After the target resource frame is obtained, picture sizes of various types need to be provided for adaptation, to adapt to terminal devices of various screen proportions, and an uncovered area may be filled with black.

The scene bullet screen is another bullet screen other than a target resource in the target multimedia resource. The scene bullet screen may make content in the shared picture richer.

Specifically, the determining a preset quantity of scene bullet screens in the target multimedia resource according to the resource time point includes:

obtaining candidate scene bullet screens from the target multimedia resource according to the resource time point and a preset time interval; and sorting the candidate scene bullet screens according to a preset sorting rule, and obtaining the preset quantity of scene bullet screens.

The preset time interval is a time interval for determining a scene bullet screen. For example, the preset time interval is five seconds. A time period of ten seconds including five seconds before the resource time point and five seconds after the resource time point is used as a candidate time period, and a candidate scene bullet screen is chosen from the candidate time period. The preset sorting rule is a rule for sorting candidate scene bullet screens. During actual application, each bullet screen has a corresponding bullet screen score, a bullet screen publishing time, and a multimedia resource time point corresponding to the bullet screen. The preset sorting rule is first choosing a bullet screen with a high bullet screen score, second choosing a bullet screen with a near bullet screen publishing time, and third choosing a bullet screen that is close to a resource time point. In a case that bullet screens satisfy all the three conditions, scene bullet screens are randomly chosen.

A quantity of scene bullet screens may be preset. For example, three scene bullet screens are chosen. After scene bullet screens are sorted, three scene bullet screens are chosen.

After the bullet screen sender identifier and the scene bullet screen are obtained, the target bullet screen, the bullet screen sender identifier, and the scene bullet screen may be added to the target resource frame to generate the to-be-shared picture. Specifically, a target bullet screen path and a preset quantity of scene bullet screen paths are set in the target resource frame, and the scene bullet screen paths are numbered. The target bullet screen and the bullet screen sender identifier are spliced to be paved in the target bullet screen path. The scene bullet screens are paved according to a number order of bullet screen paths. For example, if there are five scene bullet screen paths but a target multimedia resource has a small number of bullet screens and only three scene bullet screens are obtained, the three scene bullet screens are paved in the first three scene bullet screen paths. It needs to be noted that if a target bullet screen has excessively long content, the target bullet screen may be shortened for adaptation to allow the target bullet screen to be normally displayed in a bullet screen path.

After the target resource link is obtained in the foregoing step, a corresponding to-be-shared identifier may be generated according to the target resource link. The to-be-shared identifier is specifically represented as an image recognition identifier such as a two-dimensional code and a barcode used for sharing. A user may directly obtain the target resource link according to the to-be-shared identifier.

At this point, the shared picture may be generated according to the obtained to-be-shared picture and to-be-shared identifier in combination with the target bullet screen attribute information and the target resource attribute information.

Figure 3:
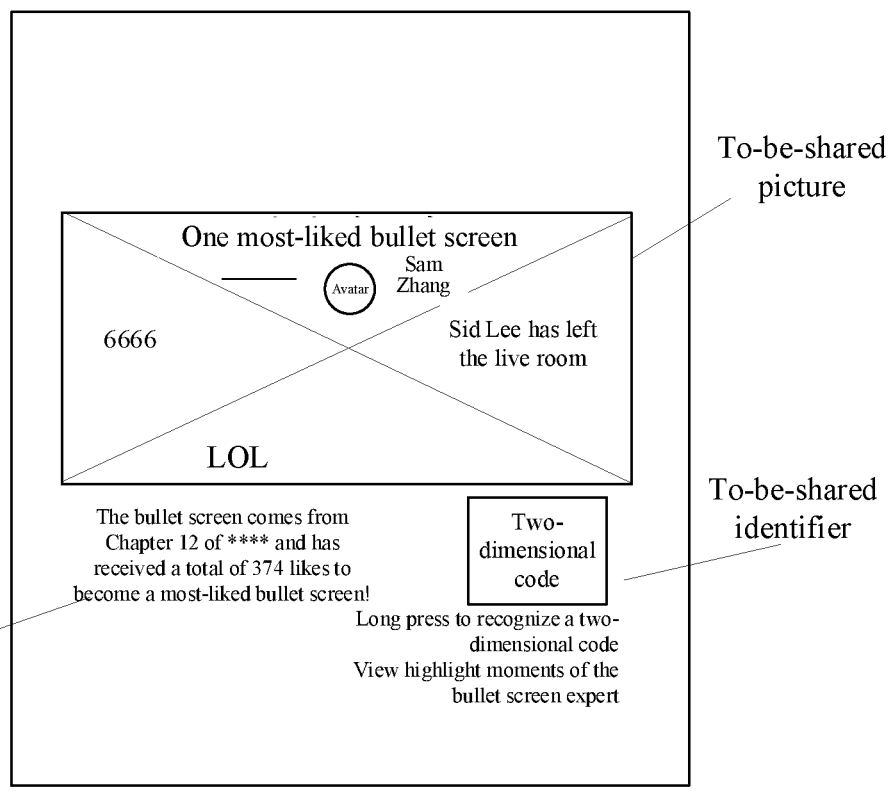
FIG. 3 is a schematic diagram of a shared picture according to an embodiment of the present application.

FIG. 3 is a schematic diagram of a shared picture according to an embodiment of the present application. As shown in FIG. 3, the to-be-shared picture includes a target bullet screen "a most-liked bullet screen" and a bullet screen sender avatar of the target bullet screen. The bullet screen sender avatar includes a bullet screen sender avatar and a bullet screen sender nickname. The to-be-shared picture further includes scene bullet screens "6666", "Sid Lee has left the live room", and "LOL". The to-be-shared picture further includes a title "The bullet screen comes from Chapter 12 of **** and has received a total of 374 likes to become a most-liked bullet screen!" generated according to the target bullet screen attribute information and the target resource attribute information. The to-be-shared picture includes a to-be-shared identifier corresponding to the target resource link that is specifically represented as a two-dimensional code. The two-dimensional code is long pressed for recognition to jump to the target resource link. The to-be-shared picture, the title, and the to-be-shared identifier form the shared picture.

S1088: Generate the prompt information according to the prompt title, the target resource link, and the shared picture.

After being obtained, the prompt title, the target resource link, and the shared picture may be spliced to form the prompt information. FIG. 2 is only an exemplary representation form of the prompt information. During actual application, sometimes shared pictures have relatively large sizes. To make the prompt information more concise, a corresponding thumbnail may further be generated according to the shared picture, and the prompt title, the target resource link, and the thumbnail of the shared picture form the prompt information.

Step 110: Send the prompt information to a target client.

After the prompt information is obtained, the prompt information may be sent to the target client. The target client is a client that can receive the prompt information.

The timing of sending the prompt information to the target client may be triggered in real time or may be triggered according to a preset time cycle. For example, after a bullet screen is determined as a target bullet screen, prompt information may be generated immediately and sent to the target client. Alternatively, the prompt information of the target bullet screen may be uniformly sent to the target client according to a preset cycle, for example, at 19:00 every day. During actual application, the prompt information may be generated as soon as the bullet screen is determined as the target bullet screen or may be generated before being sent to the target client. This is not limited in the present application.

Specifically, the sending the prompt information to a target client includes:

obtaining a resource publisher account in the target resource attribute information, and obtaining a bullet screen sender account in the target bullet screen attribute information; and sending the prompt information to a client of the resource publisher account and/or a client of the bullet screen sender account.

During actual application, the target client is specifically a client of a resource publisher and/or a client of a bullet screen sender. The two clients are two clients that are most correlated to the target bullet screen. Therefore, the resource publisher account is obtained from the target resource attribute information, and the bullet screen sender account is obtained from the target bullet screen attribute information. The prompt information is sent to a client of the resource publisher account and/or a client of the bullet screen sender account.

The present application provides a bullet screen processing method, applied to a server, and including: determining a target bullet screen based on a like count of each bullet screen in a target multimedia resource; obtaining target bullet screen attribute information of the target bullet screen and target resource attribute information of the target multimedia resource, the target bullet screen attribute information including a resource time point; determining a target playing time point of the target multimedia resource according to the resource time point; generating prompt information according to the target bullet screen, the target bullet screen attribute information, the target resource attribute information, and the target playing time point; and sending the prompt information to a target client. The bullet screen processing method provided in an embodiment of the present application can effectively exploit the potential of bullet screens, implement bullet screen sharing, guide users to watch most-liked and astonishing parts of multimedia resources, motivate users further to send high-quality bullet screens, and improve user experience.

Figure 4:
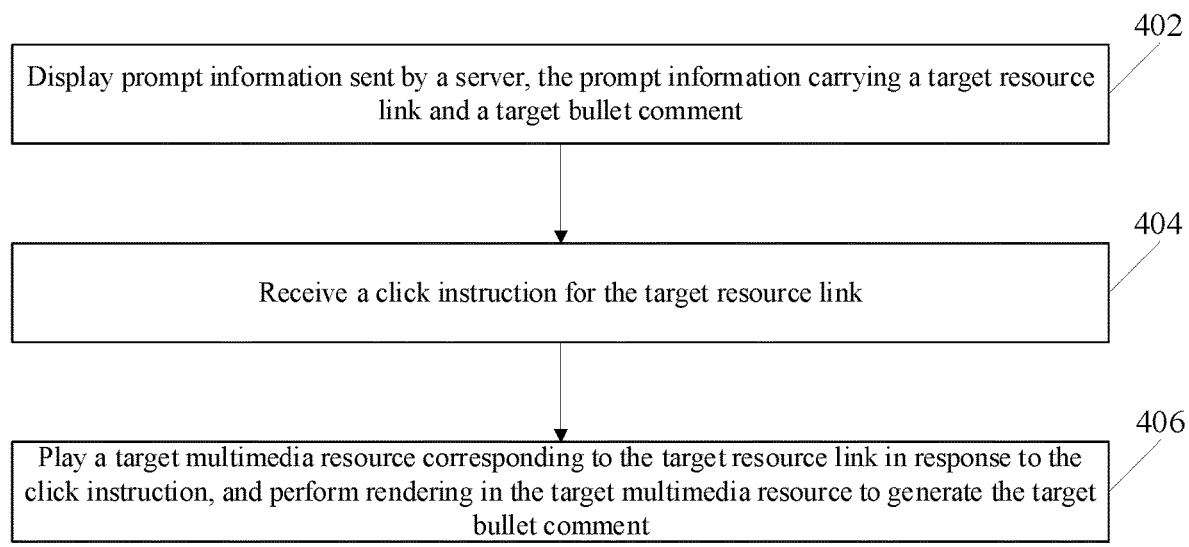
FIG. 4 is a flowchart of a bullet comment processing method applied to a client according to an embodiment of the present application.

FIG. 4 is a flowchart of a bullet screen processing method applied to a client according to an embodiment of the present application. The method specifically includes the following steps.

Step 402: Display prompt information sent by a server, the prompt information carrying a target resource link and a target bullet screen.

After generating the prompt information, the server may send the prompt information to a client. The client may be a client of a resource publisher and/or a client of a bullet screen sender. After receiving the prompt information sent by the server, the client may display the prompt information. The prompt information carries a target resource link and a target bullet screen.

Figure 5:
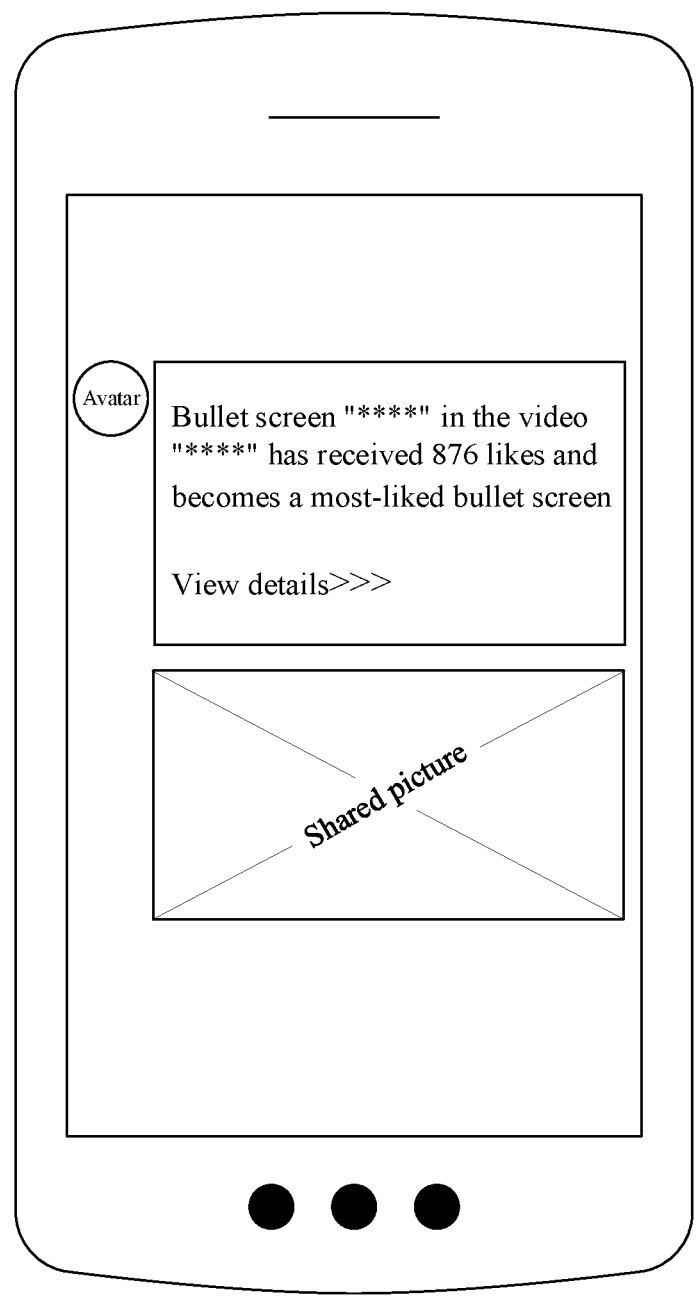
FIG. 5 is a schematic diagram of a client displaying prompt information according to an embodiment of the present application.

FIG. 5 is a schematic diagram of a client displaying prompt information according to an embodiment of the present application. As shown in FIG. 5, the prompt information sent by the server includes a prompt title, a target resource link, and a shared picture, and the target bullet screen is carried in the prompt title. The user may obtain from the prompt information which bullet screen in which multimedia resource becomes a most-liked bullet screen.

Step 404: Receive a click instruction for the target resource link.

Specifically, the user clicks the target resource link in the prompt information to send a click instruction to the client. The client receives the click instruction for the target resource link.

Step 406: Play a target multimedia resource corresponding to the target resource link in response to the click instruction, and perform rendering in the target multimedia resource to generate the target bullet screen.

Specifically, the playing a target multimedia resource corresponding to the target resource link in response to the click instruction includes:

parsing the target resource link to obtain an initial resource link and a target playing time point; and playing a target multimedia resource corresponding to the initial resource link from the target playing time point.

During actual application, after the target resource link is obtained, the target resource link is parsed to obtain an initial resource link and a target playing time point. The initial resource link is used for obtaining the target multimedia resource. The target playing time point is a time point at which the target multimedia resource starts to play. For example, after the target resource link is parsed, an initial resource link URL and a target playing time point being 01:03 are obtained. The target multimedia resource is obtained from the server according to the initial resource link URL, and then it is determined according to the target playing time point being 01:03 to start playing from 01:03 of the target multimedia resource.

Specifically, the performing rendering in the target multimedia resource to generate the target bullet screen includes:

obtaining a resource time point of the target bullet screen; and in a case that the target multimedia resource is played to the resource time point, performing rendering to generate the target bullet screen.

Based on the foregoing steps, the resource time point of the target bullet screen is obtained. The resource time point is a time point at which the target bullet screen appears in the target multimedia resource. The target multimedia resource starts to be played from the target playing time point. During playing, when the playing time reaches the resource time point, the target bullet screen is preferentially rendered, and then other bullet screens at the resource time point are rendered. Special processing such as highlighting, bolding, and color changing may further be performed on the target bullet screen. In this way, the target bullet screen is differentiated from other bullet screens. In addition, the target bullet screen is pinned to the top, to prevent the target bullet screen from being incompletely displayed because the target bullet screen is covered by other bullet screens.

In another specific implementation provided in the present application, the prompt information includes a shared picture; and the method further includes:

receiving a share instruction for the shared picture; and saving the shared picture in the client or sharing the shared picture to a third-party application in response to the share instruction.

Figure 6:
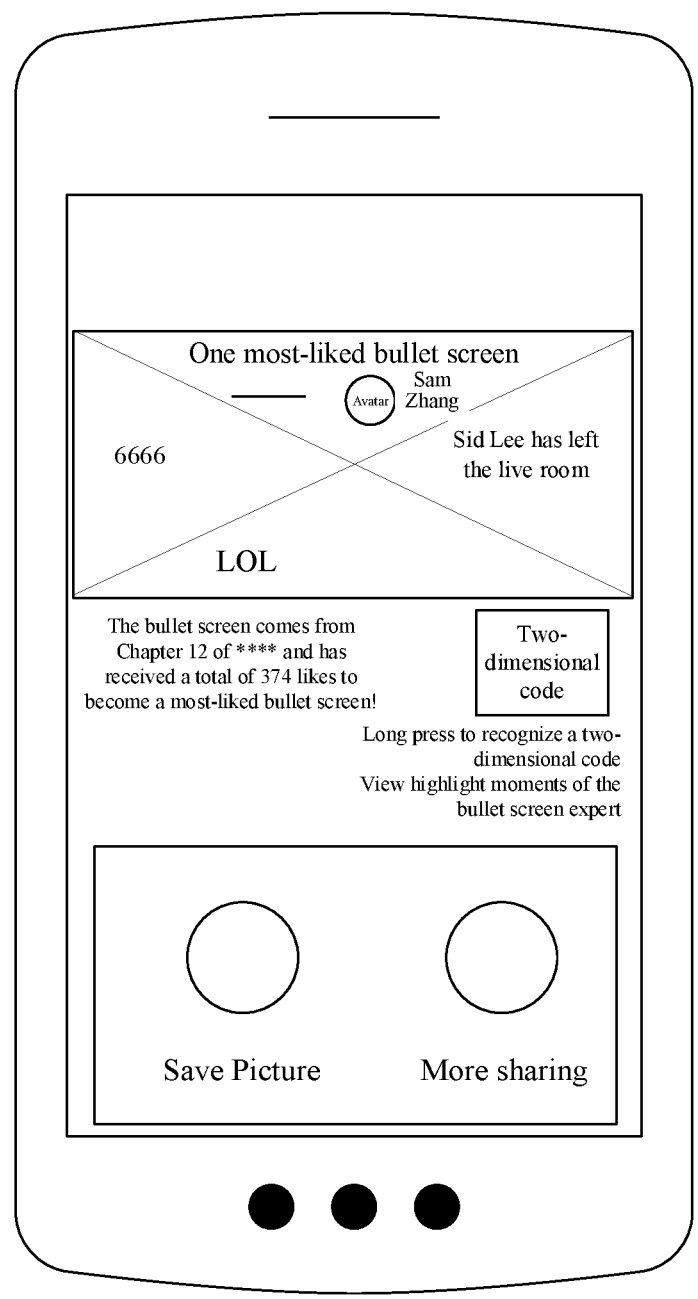
FIG. 6 is a schematic diagram of a client sharing a shared picture according to an embodiment of the present application.

During actual application, the prompt information further includes a shared picture. The shared picture in the prompt information may be in the form of a thumbnail. A user may click the thumbnail to display the entire shared picture. The user may long press the shared picture to send a share instruction for the shared picture. The shared picture may be shared in response to the share instruction. FIG. 6 is a schematic diagram of a client sharing a shared picture according to an embodiment of the present application. As shown in FIG. 6, the shared picture includes a prompt title, a to-be-shared picture, a save picture button, and more share buttons (a click may be performed to call an H5 universal share component to support a plurality of platforms. The H5 universal share component may be used to perform operations such as return, close, share to different platforms, and copy a link). A user may save a shared picture locally according to the save picture button in the shared picture or may use more share buttons to share the shared picture to different platforms.

In a case that another user receives the shared picture, the target resource link may be obtained by long pressing the shared picture to recognize a two-dimensional code, the target multimedia resource corresponding to the target resource link may be played, and rendering may be performed in the target multimedia resource to generate the target bullet screen. In this way, users other than the bullet screen sender and the resource publisher can conveniently watch the target bullet screen.

It needs to be noted that if a user recognizes the two-dimensional code in a target application, the user may directly jump to the target multimedia resource. If a user uses a third-party application to recognize the two-dimensional code, the user needs to first open the target application and jump to the target multimedia resource in the target application.

The bullet screen processing method provided in the present application is applied to a client, and includes: displaying prompt information sent by a server, the prompt information carrying a target resource link and a target bullet screen; receiving a click instruction for the target resource link; and playing a target multimedia resource corresponding to the target resource link in response to the click instruction, and performing rendering in the target multimedia resource to generate the target bullet screen. The bullet screen processing method provided in an embodiment of the present application can effectively exploit the potential of bullet screens, implement bullet screen sharing, guide users to watch most-liked and astonishing parts of multimedia resources, boost the enthusiasm of users about sending high-quality bullet screens, and improve user experience.

Figure 7:
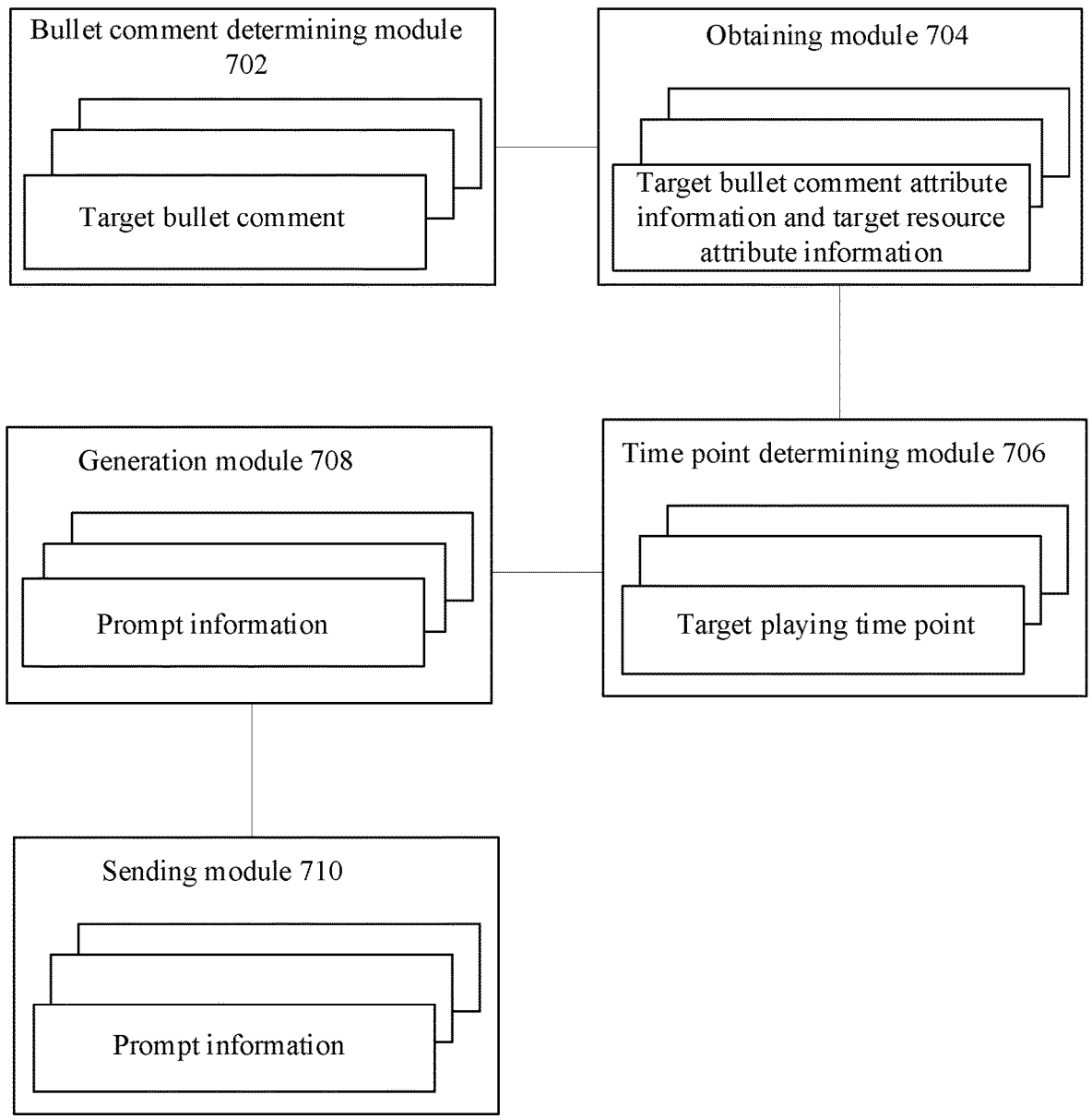
FIG. 7 is a schematic structural diagram of a bullet comment processing apparatus applied to a server according to an embodiment of the present application.

Corresponding to the foregoing embodiment of the bullet screen processing method applied to a server, the present application further provides an embodiment of a bullet screen processing apparatus applied to a server. FIG. 7 is a schematic structural diagram of a bullet screen processing apparatus applied to a server according to an embodiment of the present application. As shown in FIG. 7, the apparatus includes:

a bullet screen determining module 702, configured to determine a target bullet screen based on a like count of each bullet screen in a target multimedia resource; an obtaining module 704, configured to obtain target bullet screen attribute information of the target bullet screen and target resource attribute information of the target multimedia resource, the target bullet screen attribute information including a resource time point;

a time point determining module 706, configured to determine a target playing time point of the target multimedia resource according to the resource time point; a generation module 708, configured to generate prompt information according to the target bullet screen, the target bullet screen attribute information, the target resource attribute information, and the target playing time point; and a sending module 710, configured to send the prompt information to a target client.

Optionally, the bullet screen determining module 702 is further configured to:

count the like count of each bullet screen in the target multimedia resource; and determine a bullet screen with a like count exceeding a preset threshold as the target bullet screen.

Optionally, the bullet screen determining module 702 is further configured to:

determine the bullet screen with the like count exceeding the preset threshold as an initial target bullet screen; and in a case that the initial target bullet screen meets a target bullet screen filter condition, determine that the initial target bullet screen is the target bullet screen.

Optionally, the time point determining module 706 is further configured to:

obtain a preset time span; and subtract the preset time span from the resource time point to obtain the target playing time point of the target multimedia resource.

Optionally, the generation module 708 includes:

a title generation unit, configured to generate a prompt title according to the target bullet screen, the target bullet screen attribute information, and the target resource attribute information; and a link generation unit, configured to generate a target resource link according to the target resource attribute information and the target playing time point; a picture generation unit, configured to generate a shared picture according to the target bullet screen, the target bullet screen attribute information, the target resource attribute information, the resource time point, and the target resource link; and an information generation unit, configured to generate the prompt information according to the prompt title, the target resource link, and the shared picture.

Optionally, the title generation unit is further configured to:

obtain a target resource title in the target resource attribute information;

obtain a like count in the target bullet screen attribute information; and generate the prompt title according to the target resource title, the target bullet screen, and the like count.

Optionally, the link generation unit is further configured to:

obtain an initial resource link in the target resource attribute information; and add the target playing time point to the initial resource link to generate the target resource link.

Optionally, the picture generation unit is further configured to:

obtain a bullet screen sender identifier in the target bullet screen attribute information;

determine a target resource frame and a preset quantity of scene bullet screens in the target multimedia resource according to the resource time point;

add the target bullet screen, the bullet screen sender identifier, and the scene bullet screens to the target resource frame to generate a to-be-shared picture;

generate a to-be-shared identifier according to the target resource link; and generate the shared picture according to the to-be-shared picture, the to-be-shared identifier, the target bullet screen attribute information, and the target resource attribute information.

Optionally, the picture generation unit is further configured to: obtain candidate scene bullet screens from the target multimedia resource according to the resource time point and a preset time interval; and sort the candidate scene bullet screens according to a preset sorting rule, and obtaining the preset quantity of scene bullet screens.

Optionally, the picture generation unit is further configured to: obtain a bullet screen sender nickname and a bullet screen sender avatar in the target bullet screen attribute information.

Optionally, the sending module 710 is further configured to: obtain a resource publisher account in the target resource attribute information, and obtain a bullet screen sender account in the target bullet screen attribute information; and send the prompt information to a client of the resource publisher account and/or a client of the bullet screen sender account.

The present application provides a bullet screen processing apparatus, applied to a server, and performing steps including: determining a target bullet screen based on a like count of each bullet screen in a target multimedia resource; obtaining target bullet screen attribute information of the target bullet screen and target resource attribute information of the target multimedia resource, the target bullet screen attribute information including a resource time point; determining a target playing time point of the target multimedia resource according to the resource time point; generating prompt information according to the target bullet screen, the target bullet screen attribute information, the target resource attribute information, and the target playing time point; and sending the prompt information to a target client. The bullet screen processing apparatus provided in an embodiment of the present application can effectively exploit the potential of bullet screens, implement bullet screen sharing, guide users to watch most-liked and astonishing parts of multimedia resources, motivate users further to send high-quality bullet screens, and improve user experience.

The foregoing is a schematic solution of a bullet screen processing apparatus applied to a server in this embodiment. It needs to be noted that the technical solution of the bullet screen processing apparatus applied to a server and the foregoing bullet screen processing method applied to a server belong to the same concept. Detailed content of the technical solution of the bullet screen processing apparatus applied to a server is not described in detail. Reference may be made to the description of the technical solution of the foregoing bullet screen processing method applied to a server.

Figure 8:
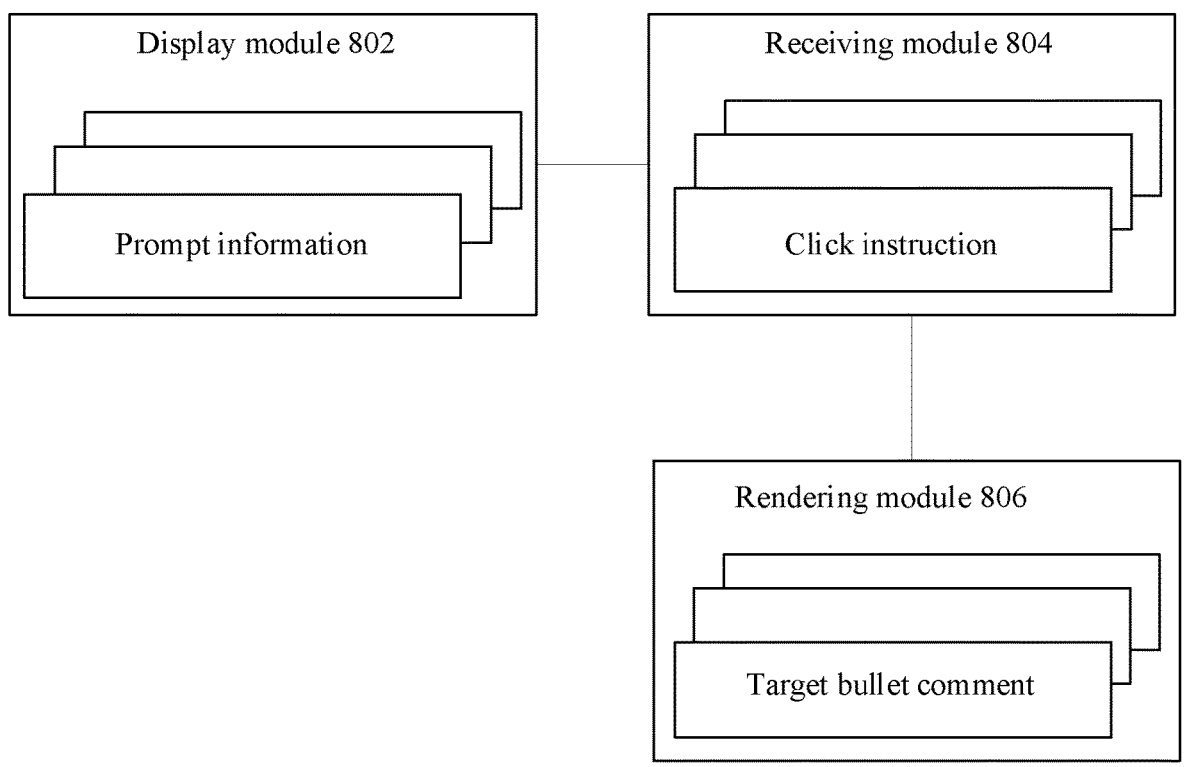
FIG. 8 is a schematic structural diagram of a bullet comment processing apparatus applied to a client according to an embodiment of the present application.

Corresponding to the foregoing embodiment of the bullet screen processing method applied to a client, the present application further provides an embodiment of a bullet screen processing apparatus applied to a client. FIG. 8 is a schematic structural diagram of a bullet screen processing apparatus applied to a client according to an embodiment of the present application. As shown in FIG. 8, the apparatus includes:

a display module 802, configured to display prompt information sent by a server, the prompt information carrying a target resource link and a target bullet screen;

a receiving module 804, configured to receive a click instruction for the target resource link; and a rendering module 806, configured to: play a target multimedia resource corresponding to the target resource link in response to the click instruction, and perform rendering in the target multimedia resource to generate the target bullet screen.

Optionally, the rendering module 710 is further configured to:

parse the target resource link to obtain an initial resource link and a target playing time point; and play the target multimedia resource corresponding to the target resource link from the target playing time point.

Optionally, the rendering module 710 is further configured to:

obtain a resource time point of the target bullet screen; and in a case that the target multimedia resource is played to the resource time point, perform rendering to generate the target bullet screen.

Optionally, the prompt information includes a shared picture; and the apparatus further includes:

an instruction receiving module, configured to receive a share instruction for the shared picture; and a sharing module, configured to save the shared picture in the client or share the shared picture to a third-party application in response to the share instruction.

The bullet screen processing apparatus provided in the present application is applied to a client, and performs steps including: displaying prompt information sent by a server, the prompt information carrying a target resource link and a target bullet screen; receiving a click instruction for the target resource link; and playing a target multimedia resource corresponding to the target resource link in response to the click instruction, and performing rendering in the target multimedia resource to generate the target bullet screen. The bullet screen processing apparatus provided in an embodiment of the present application can effectively exploit the potential of bullet screens, implement bullet screen sharing, guide users to watch most-liked and astonishing parts of multimedia resources, boost the enthusiasm of users about sending high-quality bullet screens, and improve user experience.

The foregoing is a schematic solution of a bullet screen processing apparatus applied to a client in this embodiment. It needs to be noted that the technical solution of the bullet screen processing apparatus applied to a client and the foregoing bullet screen processing method applied to a client belong to the same concept. Detailed content of the technical solution of the bullet screen processing apparatus applied to a client is not described in detail. Reference may be made to the description of the technical solution of the foregoing bullet screen processing method applied to a client.

Figure 9:
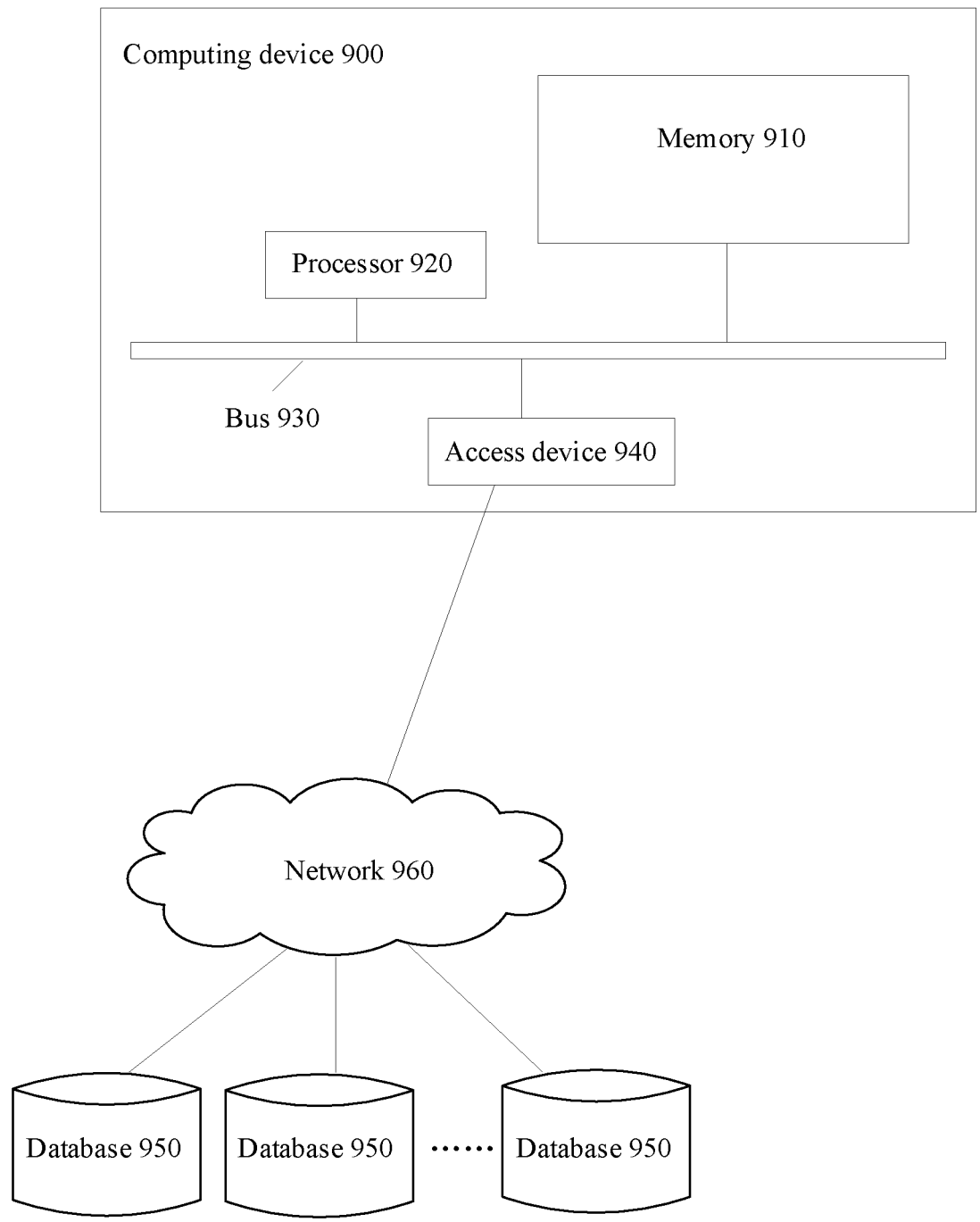
FIG. 9 is a schematic block diagram of a computing device according to an embodiment of the present application.

FIG. 9 is a schematic block diagram of a computing device 900 according to an embodiment of the present application. The computing device 900 includes, but not limited to, a memory 910 and a processor 920. The processor 920 is connected to the memory 910 by a bus 930. A database 950 is configured to store data.

The computing device 900 further includes an access device 940. The access device 940 allows the computing device 900 to perform communication via one or more networks 960. Examples of these networks include a public switched telephone network (PSTN), a local area network (LAN), a wide area network (WAN), a personal area network (PAN), or a combination of communication networks such as the Internet. The access device 940 may include one or more of any type of wired or wireless network interface (for example, a network interface card (NIC)), such as an IEEE 802.11 wireless local area network (WLAN) wireless interface, a Worldwide Interoperability for Microwave Access (Wi-MAX) interface, an Ethernet interface, a universal serial bus (USB) interface, a cellular network interface, a Bluetooth interface, a near field communication (NFC) interface, and the like.

In an embodiment of the present application, the above components of the computing device 900 and other components not shown in FIG. 9 may also be connected to each other, for example, by a bus. It should be understood that the structural block diagram of the computing device shown in FIG. 9 is for exemplary purposes only and does not constitute a limitation to the scope of the present application. Those skilled in the art may add or replace other components as required.

The computing device 900 may be any type of stationary or mobile computing device, including a mobile computer or mobile computing device (for example, a tablet computer, a personal digital assistant, a laptop computer, a netbook, etc.), a mobile phone (for example, a smartphone), a wearable computing device (for example, a smartwatch, and smart glasses), or another type of mobile device, or a stationary computing device such as a desktop computer or a PC. The computing device 900 may be a mobile or stationary server.

The processor 920 executes the computer instruction to implement the steps of the bullet screen processing method applied to a server or the bullet screen processing method applied to a client.

The foregoing is a schematic solution of a computing device in this embodiment. It needs to be noted that the technical solution of the computing device and the foregoing technical solution of the bullet screen processing method applied to a server or the bullet screen processing method applied to a client belong to the same concept. Detailed content of the technical solution of the computing device is not described in detail. Reference may be made to the description of the foregoing technical solution of the bullet screen processing method applied to a server or the bullet screen processing method applied to a client.

An embodiment of the present application further provides a computer-readable storage medium is provided, storing a computer instruction, where a processor executes the computer instruction to implement the steps of the bullet screen processing method applied to a server or the bullet screen processing method applied to a client.

The foregoing is a schematic solution of a computer-readable storage medium in this embodiment. It needs to be noted that the technical solution of the storage medium and the foregoing technical solution of the bullet screen processing method applied to a server or the bullet screen processing method applied to a client belong to the same concept. Detailed content of the technical solution of the storage medium is not described in detail. Reference may be made to the description of the foregoing technical solution of the bullet screen processing method applied to a server or the bullet screen processing method applied to a client.

Specific embodiments of the present application are described above. Other embodiments fall within the scope of the appended claims. In some cases, the actions or steps documented in the claims may be performed in a different order than that in the embodiments and still achieve the desired results. In addition, the processes depicted in the accompanying drawings do not necessarily require the particular order or sequential order shown to achieve the desired results. In some implementations, multitasking and parallel processing may also be possible or may be advantageous.

The computer instructions include computer program code. The computer program code may be in the form of source code, in the form of object code, in the form of an executable file or in some intermediate form, or the like. The computer-readable medium may include: any entity or apparatus capable of carrying the computer program code, a recording medium, a USB flash drive, a removable hard drive, a disk, an optical disc, a computer memory, a read-only memory (ROM), a random access memory (RAM), an electrical carrier signal, a telecommunication signal, and a software distribution medium, or the like. It needs to be noted that the content contained in the computer-readable medium may be added or omitted as appropriate according to the requirements of legislation and patent practice in the jurisdiction. For example, in some jurisdictions, according to legislation and patent practice, the computer-readable medium does not include an electric carrier signal and a telecommunication signal.

It needs to be noted that the foregoing method embodiments are presented as a series of actions for simplicity of description, but those skilled in the art should be aware that the present application is not limited by the sequence of actions described, as some steps may be performed in other sequences or simultaneously according to the present application. Secondly, those skilled in the art should also be aware that the embodiments described in the specification are all preferred embodiments and that the actions and modules involved are not necessarily essential for the present application.

In the foregoing embodiments, the description of each embodiment has its own focus, and for what is not described in detail in an embodiment, reference may be made to related description in other embodiments.

The above-disclosed preferred embodiments of the present application are used only to help illustrate the present application. The optional embodiments are not an exhaustive recitation of all details, nor do they limit the invention to the specific embodiments described. Obviously, many modifications and variations may be made in accordance with the content of the present application. These embodiments have been selected and specifically described in the present application to better explain the principles and practical applications of the present application for those skilled in the art to which they belong to adequately understand and utilize the present application. The present application is limited only by the claims and their full scope and equivalents.

What is claimed is:

1. A method of processing bullet screens, comprising:
   determining a target bullet screen based at least in part on a number of likes received by each bullet screen associated with a target multimedia resource;
   obtaining attribute information associated with the target bullet screen and attribute information associated with the target multimedia resource, wherein the attribute information associated with the target bullet screen comprises a resource time point indicating a time point of displaying the target bullet screen in the target multimedia resource;
   determining a target time point in the target multimedia resource from which the target multimedia resource starts to play based at least in part on the resource time point;

generating prompt information based on the target bullet screen, the attribute information associated with the target bullet screen, the attribute information associated with the target multimedia resource, and the target time point, wherein the generating prompt information based on the target bullet screen, the attribute information associated with the target bullet screen, the attribute information associated with the target multimedia resource, and the target time point comprises:
  generating a prompt title based on the target bullet screen, the attribute information associated with the target bullet screen, and the attribute information associated with the target multimedia resource,
  generating a target resource link based on the attribute information associated with the target multimedia resource and the target time point,
  generating a picture based on the target bullet screen, the attribute information associated with the target bullet screen, the attribute information associated with the target multimedia resource, the resource time point, and the target resource link, and
  generating the prompt information based on the prompt title, the target resource link, and the picture; and
sending the prompt information to a target client computing device.

2. The method of claim 1, wherein the generating a prompt title based on the target bullet screen, the attribute information associated with the target bullet screen, and the attribute information associated with the target multimedia resource comprises:
  determining a title of the target multimedia resource based on the attribute information associated with the target multimedia resource;
  determining a number of likes received by the target bullet screen based on the attribute information associated with the target bullet screen; and
  generating the prompt title based on the title of the target multimedia resource, the target bullet screen, and the number of likes received by the target bullet screen.

3. The method of claim 1, wherein the generating a target resource link based on the attribute information associated with the target multimedia resource and the target time point comprises:
  obtaining an initial resource link from the attribute information associated with the target multimedia resource; and
  generating the target resource link by integrating information indicating the target time point into the initial resource link.

4. The method of claim 1, wherein the generating a picture based on the target bullet screen, the attribute information associated with the target bullet screen, the attribute information associated with the target multimedia resource, the resource time point, and the target resource link comprises:
  obtaining identification information of a user who sent a comment corresponding to the target bullet screen from the attribute information associated with the target bullet screen;
  determining at least one target resource frame and a predetermined number of scene bullet screens in the target multimedia resource based on the resource time point;
  generating a to-be-shared picture by integrating the target bullet screen, the identification information, and the predetermined number of scene bullet screens into the at least one target resource frame;
  generating a to-be-shared identifier based on the target resource link; and
  generating the picture based on the to-be-shared picture, the to-be-shared identifier, the attribute information associated with the target bullet screen, and the attribute information associated with the target multimedia resource.

5. The method of claim 4, wherein the determining a predetermined number of scene bullet screens in the target multimedia resource based on the resource time point comprises:
  obtaining candidate scene bullet screens in the target multimedia resource based on the resource time point and a predetermined time period; and
  sorting the candidate scene bullet screens based on a predetermined sorting rule; and
  obtaining the predetermined number of scene bullet screens based on a result of the sorting.

6. The method of claim 4, wherein the obtaining identification information of a user who sent a comment corresponding to the target bullet screen from the attribute information associated with the target bullet screen comprises:
  obtaining a nickname of the user and a profile picture of the user from the attribute information associated with the target bullet screen.

7. The method of claim 1, wherein the sending the prompt information to a target client computing device comprises:
  obtaining account information of a first user who published the target multimedia resource from the attribute information associated with the target multimedia resource;
  obtaining account information of a second user who sent a comment corresponding to the target bullet screen from the attribute information associated with the target bullet screen; and
  sending the prompt information to the client computing device associated with the first user or a second user.

8. A system, comprising:
at least one processor; and
at least one memory communicatively coupled to the at least one processor and comprising computer-readable instructions that upon execution by the at least one processor cause the at least one processor to perform operations comprising:
determining a target bullet screen based at least in part on a number of likes received by each bullet screen associated with a target multimedia resource;
obtaining attribute information associated with the target bullet screen and attribute information associated with the target multimedia resource, wherein the attribute information associated with the target bullet screen comprises a resource time point indicating a time point of displaying the target bullet screen in the target multimedia resource;
determining a target time point in the target multimedia resource from which the target multimedia resource starts to play based at least in part on the resource time point;
generating prompt information based on the target bullet screen, the attribute information associated with the target bullet screen, the attribute information associated with the target multimedia resource, and the target time point, wherein the generating prompt information based on the target bullet screen, the attribute information associated with the target bullet screen, the attribute information associated with the target multimedia resource, and the target time point comprises:
   generating a prompt title based on the target bullet screen, the attribute information associated with the target bullet screen, and the attribute information associated with the target multimedia resource,
   generating a target resource link based on the attribute information associated with the target multimedia resource and the target time point,
   generating a picture based on the target bullet screen, the attribute information associated with the target bullet screen, the attribute information associated with the target multimedia resource, the resource time point, and the target resource link, and
   generating the prompt information based on the prompt title, the target resource link, and the picture; and
   sending the prompt information to a target client computing device.

9. The system of claim 8, wherein the generating a prompt title based on the target bullet screen, the attribute information associated with the target bullet screen, and the attribute information associated with the target multimedia resource comprises:
   determining a title of the target multimedia resource based on the attribute information associated with the target multimedia resource;
   determining a number of likes received by the target bullet screen based on the attribute information associated with the target bullet screen; and
   generating the prompt title based on the title of the target multimedia resource, the target bullet screen, and the number of likes received by the target bullet screen.

10. The system of claim 8, wherein the generating a target resource link based on the attribute information associated with the target multimedia resource and the target time point comprises:
   obtaining an initial resource link from the attribute information associated with the target multimedia resource; and
   generating the target resource link by integrating information indicating the target time point into the initial resource link.

11. The system of claim 8, wherein the generating a picture based on the target bullet screen, the attribute information associated with the target bullet screen, the attribute information associated with the target multimedia resource, the resource time point, and the target resource link comprises:
   obtaining identification information of a user who sent a comment corresponding to the target bullet screen from the attribute information associated with the target bullet screen;
   determining at least one target resource frame and a predetermined number of scene bullet screens in the target multimedia resource based on the resource time point;
   generating a to-be-shared picture by integrating the target bullet screen, the identification information, and the predetermined number of scene bullet screens into the at least one target resource frame;
   generating a to-be-shared identifier based on the target resource link; and
   generating the picture based on the to-be-shared picture, the to-be-shared identifier, the attribute information associated with the target bullet screen, and the attribute information associated with the target multimedia resource.

12. The system of claim 11, wherein the determining a predetermined number of scene bullet screens in the target multimedia resource based on the resource time point comprises:
   obtaining candidate scene bullet screens in the target multimedia resource based on the resource time point and a predetermined time period; and
   sorting the candidate scene bullet screens based on a predetermined sorting rule; and
   obtaining the predetermined number of scene bullet screens based on a result of the sorting.

13. The system of claim 11, wherein the obtaining identification information of a user who sent a comment corresponding to the target bullet screen from the attribute information associated with the target bullet screen comprises:
   obtaining a nickname of the user and a profile picture of the user from the attribute information associated with the target bullet screen.

14. The system of claim 8, wherein the sending the prompt information to a target client computing device comprises:
   obtaining account information of a first user who published the target multimedia resource from the attribute information associated with the target multimedia resource;
   obtaining account information of a second user who sent a comment corresponding to the target bullet screen from the attribute information associated with the target bullet screen; and
   sending the prompt information to the client computing device associated with the first user or a second user.

15. A system, comprising:
   at least one processor; and
   at least one memory communicatively coupled to the at least one processor and comprising computer-readable instructions that upon execution by the at least one processor cause the at least one processor to perform operations comprising:
   receiving prompt information from a server computing device, wherein the prompt information is associated with a target bullet screen, wherein the target bullet screen is determined based on a number of likes received by each bullet screen associated with a target multimedia resource, wherein the prompt information is generated based on the target bullet screen, attribute information of the target bullet screen, attribute information associated with the target multimedia resource, and a target time point in the target multimedia resource from which the target multimedia resource starts to play, and wherein the target time point is determined based on the attribute information of the target bullet screen comprising a resource time point indicating a time point of displaying the target bullet screen in the target multimedia resource;
   displaying the prompt information carrying a target resource link and the target bullet screen, wherein the target resource link is generated based on the attribute information associated with the target multimedia resource and the target time point;
   playing the target multimedia resource starting from the target time point in response to receiving user input on the prompt information;
   rendering the target bullet screen in the target multimedia resource in response to determining that the target multimedia resource is played to the resource time point;

wherein the prompt information further comprises a prompt title that is generated based on the target bullet screen, the attribute information associated with the target bullet screen, and the attribute information associated with the target multimedia resource; and wherein the prompt information further comprises a picture that is generated based on the target bullet screen, the attribute information associated with the target bullet screen, the attribute information associated with the target multimedia resource, the resource time point, and the target resource link; and wherein the prompt information is generated based on the target resource link, the prompt title, and the picture.

16. The system of claim 15, wherein the picture is generated by integrating the target bullet screen and identification information of a user who sent a comment corresponding to the target bullet screen into a target frame of the target multimedia resource, wherein the target frame is determined based on the resource time point, and wherein the picture is configured to be locally stored or shared to a third-party application.

17. A non-transitory computer-readable storage medium, storing computer-readable instructions that upon execution by a processor cause the processor to implement operations comprising:

determining a target bullet screen based at least in part on a number of likes received by each bullet screen associated with a target multimedia resource;

obtaining attribute information associated with the target bullet screen and attribute information associated with the target multimedia resource, wherein the attribute information associated with the target bullet screen comprises a resource time point indicating a time point of displaying the target bullet screen in the target multimedia resource;

determining a target time point in the target multimedia resource from which the target multimedia resource starts to play based at least in part on the resource time point;

generating prompt information based on the target bullet screen, the attribute information associated with the target bullet screen, the attribute information associated with the target multimedia resource, and the target time point, wherein the generating prompt information based on the target bullet screen, the attribute information associated with the target bullet screen, the attribute information associated with the target multimedia resource, and the target time point comprises:

generating a prompt title based on the target bullet screen, the attribute information associated with the target bullet screen, and the attribute information associated with the target multimedia resource, generating a target resource link based on the attribute information associated with the target multimedia resource and the target time point, generating a picture based on the target bullet screen, the attribute information associated with the target bullet screen, the attribute information associated with the target multimedia resource, the resource time point, and the target resource link, and generating the prompt information based on the prompt title, the target resource link, and the picture; and sending the prompt information to a target client computing device.

* * * * *